United States Patent [19]

Suda et al.

[11] 3,928,471
[45] Dec. 23, 1975

[54] METHOD FOR THE SEPARATION OF 5-ISOPROPYL-M-CRESOL

[75] Inventors: Hideaki Suda, Takaishi; Norio Kotera, Amagasaki; Shinichi Hasegawa, Settsu, all of Japan

[73] Assignee: Sumitomo Chemical Company, Limited, Japan

[22] Filed: Aug. 9, 1973

[21] Appl. No.: 387,167

[30] Foreign Application Priority Data
Aug. 9, 1972  Japan.............................. 47-80171
Aug. 9, 1972  Japan.............................. 47-80174

[52] U.S. Cl........................... 260/627 G; 260/626 R
[51] Int. Cl.².................... C07C 37/44; C07C 39/06
[58] Field of Search............ 260/626, 624 A, 627 G, 260/626 R, 624 R, 621 A, 627 R

[56] References Cited
UNITED STATES PATENTS
2,435,087   1/1948   Luten et al. .......................... 260/621

FOREIGN PATENTS OR APPLICATIONS
1,227,924   4/1971   United Kingdom ............. 260/626 T
3,718,179   11/1962  Japan .............................. 260/626 T
645,446     1/1950   United Kingdom............. 260/624 A

OTHER PUBLICATIONS

Stevens, *Industrial and Engineering Chemistry* Vol. 35, No. 6 (1943), pp. 655–660.

*Primary Examiner*—James O. Thomas, Jr.
*Assistant Examiner*—W. B. Lone
*Attorney, Agent, or Firm*—Stewart and Kolasch, Ltd.

[57] ABSTRACT

A method for the separation of 5-isopropyl-m-cresol, which is useful for the production of insecticides and disinfectants, from a mixture of isopropylated cresol containing 4-isopropyl-m-cresol and 3-isopropyl-p-cresol, and further optionally 2,6-diisopropyl-m- and p-cresols as well as 5-isopropyl-m-cresol, which comprises alkylating the mixture with an alkylating agent having from 4 to 12 carbon atoms and recovering the unalkylated 5-isopropyl-m-cresol from the resulting mixture by an alkali extraction.

5 Claims, No Drawings

METHOD FOR THE SEPARATION OF 5-ISOPROPYL-M-CRESOL

The present invention relates to a method for the separation of 5-isopropyl-m-cresol. More particularly, it relates to a method for the selective separation of 5-isopropyl-m-cresol from a mixture of isopropylated cresols.

It has, hitherto, been known that 5-isopropyl-m-cresol is useful as a raw material for preparing disinfectants and agricultural chemicals such as insecticides. 5-Isopropyl-m-cresol has been prepared by isopropylation of m-cresol, or isomerization or trans-alkylation of other isopropyl-m-cresols.

According to these well-known methods, it has been, however, obtained as a mixture with other isomers and analogous compounds. That is, the product contains, in addition to 5-isopropyl-m-cresol, mono- or poly-isopropyl-m-cresol isomers, cresols and other isopropylcresols. Some of them have a boiling point very close to that of 5-isopropyl-m-cresol, and therefore, it is very difficult to separate 5-isopropyl-m-cresol from other compounds by a usual rectification. For intance, when a commercially available technical grade "m-cresol" is subjected to isopropylation, it gives a mixture containing, in addition to 5-isopropyl-m-cresol, m-cresol, 6-isopropyl-m-cresol (thymol), 4-isopropyl-m-cresol, 2,6-diisopropyl-m-cresol, 4,6-diisopropyl-m-cresol, and further small amounts of p-cresol, 2-isopropyl-p-cresol, 3-isopropyl-p-cresol, 2,6-diisopropyl-p-cresol, and the like. Among those m- and p-cresol, 2-isopropyl-p-cresol and 4,6-diisopropyl-m-cresol can be removed relatively readily by a usual rectification since they have a boiling point relatively different from that of 5-isopropyl-m-cresol. Thymol, whose boiling point is relatively different from that of 5-isopropyl-m-cresol, can be separated from 5-isopropyl-m-cresol by rectification, but the fraction of 5-isopropyl-m-cresol may be sometimes contaminated with small amounts of thymol and 2-isopropyl-p-cresol according to the rectification condition. On the other hand, other components, i.e., 4-isopropyl-m-cresol, 2,6-diisopropyl-m-cresol, 3-isopropyl-p-cresol and 2,6-diisopropyl-p-cresol are extremely hardly separated from 5-isopropyl-m-cresol by a usual rectification, since they have a boiling point very close to that of 5-isopropyl-m-cresol.

The separation of 5-isopropyl-m-cresol from other components by a method other than rectification is also very difficult. For instance, when the above-mentioned mixture is subjected to a usual rectification to remove almost all the m-cresol and 4,6-diisopropyl-m-cresol and most of the thymol and the resulting mixture is cooled, a considerable portion of 4-isopropyl-m-cresol having a high melting point can be separated by filtration from the mixture in the form of crystals. However, the filtrate still contains great amounts of 4-isopropyl-m-cresol, in addition to 5-isopropyl-m-cresol. Accordingly, it is substantially impossible to make the ratio of 4-isopropyl-m-cresol to 5-isopropyl-m-cresol sufficiently small.

The present inventors have found that both 2,6-diisopropyl-m-cresol and 2,6-diisopropyl-p-cresol can substantially completely be removed by treating the mixture with an aqueous alkali solution, but 5-isopropyl-m-cresol is still contaminated with a considerable amount of 4-isopropyl-m-cresol and all of the 3-isopropyl-p-cresol even by the alkali extraction method or further even by combining this method with the other methods above-mentioned. Accordingly, it is extremely difficult to separate efficiently 5-isopropyl-m-cresol in high purity when a conventional separation method is merely applied thereto.

It has been studied to find a method for the selective separation of 5-isopropyl-m-cresol alone from a mixture of isopropylated cresols, and has been found that when the mixture is subjected to a nuclear alkylation with an alkylating agent having not less than 3, preferably not less than 4 carbon atoms, 5-isopropyl-m-cresol alone can be recovered almost quantitatively without being alkylated. It has been further found that the isopropylated cresols substituted at the 2- or 6-position with an alkyl group having not less than 3, preferably not less than 4 carbon atoms, are substantially insoluble in an aqueous alkali solution.

One object of the present invention is to provide, based on these findings, a method for separating 5-isopropyl-m-cresol from a mixture of isopropylated cresols being substantially free from a 2,6-diisopropyl derivative, characterized in that said mixture is subjected to a nuclear alkylation with an alkylating agent having not less than 3 carbon atoms, and then the resulting mixture is rectified to recover 5-isopropyl-m-cresol.

Another object of the present invention is to provide a method for separating 5-isopropyl-m-cresol from a mixture of isopropylated cresols including the 2,6-diisopropyl derivative, characterized in that said mixture is subjected to a nuclear alkylation with an alkylating agent having not less than 3, preferably not less than 4 carbon atoms, the resulting alkylated mixture is extracted with an aqueous alkali solution, and then the 5-isopropyl-m-cresol is recovered from the alkali extract.

Thus, the present invention is to provide a method for the separation of 5-isopropyl-m-cresol from a mixture of isopropylated cresols containing 5-isopropyl-m-cresol, 4-isopropyl-m-cresol and 3-isopropyl-p-cresol, which mixture is substantially free from unreacted m- and p-cresols, 6-isopropyl-m-cresol, 2-isopropyl-p-cresol and 4,6-diisopropyl-m-cresol, which can be removed by a rectification, and is optionally free from 2,6-diisopropyl-m- and p-cresols, which comprises reacting the mixture with an alkylating agent having not less than 3 carbon atoms, and recovering unalkylated 5-isopropyl-m-cresol from the resulting mixture.

As to a starting material, i.e., a mixture of isopropylated cresols, it is natural that a higher content of 5-isopropyl-m-cresol is more economically advantageous. However, the content does not necessarily have to be high, but it is restricted from an economical viewpoint. The mixture as a starting material may be a product prepared by a conventional method for the production of 5-isopropyl-m-cresol, such as isopropylation of cresol, or isomerization of isopropyl cresol isomers, or may be a by-product obtained in a preparation of other isopropyl cresols, for example thymol. These mixtures can be used as they are, or can be used after 2,6-diisopropyl derivatives are removed therefrom by the above mentioned alkali extraction or extraction-distillation process.

The alkylating agent may be selected from monoolefins, alkyl halides and alcohols, whose carbon atoms are not less than 3, preferably not less than 4. The most suitable examples of alkylating agent may be selected from the known alkylating agents by taking into account its economics and reactivity. Any alkylating agents having not less than 3 carbon atoms can give the desired results similarly, when they are reacted under an appropriate condition.

As one of the alkylating agents, there may be employed monoolefins having not less than 3 carbon atoms, preferably 4 to 12 carbon atoms. Suitable examples include propylene, butene or their isomers, isobutylene, or a mixture thereof. A gas fraction having 4 carbon atoms as produced in the petrochemical industry, for example, in the naphtha cracking process, being free from butadiene, which is the so-called B.B. fraction, is favorable from an industrial viewpoint.

As the alkylation catalyzer, there may be used one or more kinds of well-known alkylation catalyzers. Suitable examples include mineral acids such as hydrogen fluoride, sulfuric acid, phosphoric acid and perchloric acid; sulfonic acids such as p-toluene sulfonic acid; halogenated compounds such as aluminum chloride, boron trifluoride, ferric chloride, zinc chloride, titanium chloride, and complexes thereof; and solid catalyzers such as alumino-silicate, terra alba, and sulfonic acid type ion exchange resins.

The conditions of alkylation such as reaction temperature, pressure and time depend upon the composition of the materials used, the kind and physical property of the alkylating agent, and the kind of catalyzer, however, it is preferable to use conditions that are as mild as possible for inhibiting the side reactions such as transfer of an alkyl group or isomerization. For instance, the reaction temperature, pressure and time may be, taking into account economics, preferably 0° to 300°C, an atmospheric pressure to about 10 kg/cm$^2$, and 1 second to 10 hours, respectively. The operation conditions will be illustrated in the examples hereinafter, but are not limited thereto.

The alkylating agent is preferably used in the theoretical amount or more required for alkylating all the existing impurities, and in general in the amount of about 1.0 to about 2.5 times by weight of the theoretical.

When the starting material is substantially free from 2,6-diisopropyl derivatives, the resulting mixture obtained by alkylation is neutralized to remove catalyzer, and then is subjected to a simple rectification to give a 5-isopropyl-m-cresol fraction in high purity. The rectification can be effected under a pressure of 5 mmHg gauge to atmospheric pressure at a reflux ratio of 1 to 10, preferably 3 to 4, with 10 to 30 theoretical plates.

On the other hand, when a starting material containing 2,6-diisopropyl derivatives is used, the resulting mixture obtained by alkylation is subjected to the alkali extraction after removing the catalyzer or not.

The aqueous alkali solution used for the extraction may be an aqueous solution of strong alkali, such as sodium hydroxide or potassium hydroxide, which is capable of forming a salt with phenols. The concentration of the aqueous alkali solution may be in a range of 1 to 30 percent, preferably 5 to 20 percent by weight. The extraction temperature is preferably 0° to 100°C. The amount of alkali may be about 0.5 to 5 times, preferably 0.8 to 2 times by mol, based on the 5-isopropyl-m-cresol to be extracted. When a smaller amount of alkali is used, 5-isopropyl-m-cresol can not sufficiently be extracted. On the other hand, when an excess amount of alkali is used, it results in waste of alkalis and acids, and further often results in undesirable components easily transferring to the alkali layer. Needless to say, the amount of alkali should be decided by taking into account the amount of hydrogen halide resulting from the catalyzer and the alkylating agent remaining in the reaction mixture.

A solvent sparingly soluble in water may be used to facilitate the separation of an alkali layer from a solvent layer. A solvent is also used to remove impurities completely, which are not inherently extracted with alkali but dissolved in an alkali layer in a trace, from the alkali layer.

As the solvents, there may be employed aromatic hydrocarbons (e.g. benzene, toluene and xylene), cyclic or aliphatic hydrocarbons (e.g. cyclohexane, hexane and ligroin), halogenated hydrocarbons (e.g. carbon tetrachloride, dichloroethane, trichloroethylene and perchloroethylene), ethers (e.g. diisopropyl ether), esters (e.g. ethyl acetate and butyl acetate), and ketones (e.g. methyl isobutyl ketone). The separation may be carried out preferably at a temperature of about 0° to 50°C.

5-Isopropyl-m-cresol can be recovered from the alkali extract by adding an acidic substance thereto. The acidic substances may be an organic or inorganic acid (e.g. hydrochloric acid, sulfuric acid, phosphoric acid, acetic acid and p-toluenesulfonic acid), an acidic gas (e.g. carbon dioxide gas and sulfurous acid gas), and acidic ion exchange resins. The amount of acidic substances may be that sufficient to make the pH value of the alkali extract less than 10, preferably 5 to 9, and it may be generally around the equivalent amount with respect to that of the alkali used. The temperature of neutralization is in the range of from 0°C to the boiling point of the mixture.

The mixture, from which 5-isopropyl-m-cresol is separated by the addition of an acidic substance, is allowed to stand and the resulting oily layer is separated and recovered, in which a suitable solvent may be added to carry out the separation more effectively. The separation is generally carried out at a temperature from 0° to 50°C.

The present invention will be more clearly understood from the following comparative tests, in which the starting material was substantially free from 2,6-diisopropyl derivatives and the alkylating agent was propylene. An outline of the tests is as shown in Table 1.

Table 1

| Component | Isopropylated cresols | | | Method of the present invention | |
| --- | --- | --- | --- | --- | --- |
| | Separation from 5-isopropyl-m-cresol by rectification | Extraction with alkali | | Isopropylated compounds | Separation from 5-isopropyl-m-cresol by rectification |
| | 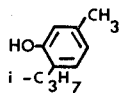 | a little easy | extracted | 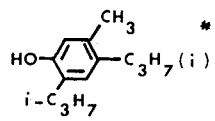 | easy |

Table 1-continued

| Component | Isopropylated cresols | | Method of the present invention | |
| --- | --- | --- | --- | --- |
| | Separation from 5-isopropyl-m-cresol by rectification | Extraction with alkali | Isopropylated compounds | Separation from 5-isopropyl-m-cresol by rectification |
| 2,6-diisopropyl-p-cresol | very difficult | not extracted | not contained in the starting mixture of isopropylated cresols | |
| 2,6-diisopropyl-m-cresol | very difficult | not extracted | not contained in the starting mixture of isopropylated cresols | |
| 3-isopropyl-p-cresol | very difficult | extracted | (structure shown) | easy |
| 5-isopropyl-m-cresol | — | extracted | hardly isopropylated | — |
| 4-isopropyl-m-cresol | difficult | extracted | (structure shown) * | easy |
| 4,6-diisopropyl-m-cresol | easy | extracted | not isopropylated* | easy |

[Remark]: *) In these cases, all mean the same compound.

As shown in Table 1, when a mixture of isopropylated cresols is subjected to rectification, compounds which can not substantially be separated from 5-isopropyl-m-cresol are the following four compounds, i.e., 2,6-diisopropyl-m-cresol, 2,6-diisopropyl-p-cresol, 3-isopropyl-p-cresol and 4-isopropyl-m-cresol. Among those, the former two compounds can be removed by extraction with alkali since they can not be extracted with alkali, however the other two compounds are left unremoved. When 5-isopropyl-m-cresol contaminated with the two unremoved compounds is subjected to isopropylation, 5-isopropyl-m-cresol is hardly alkylated, but the other two compounds are easily converted to 2,5-diisopropyl-p-cresol and 4,6-diisopropyl-m-cresol, respectively. The latter two compounds have higher boiling points than that of 5-isopropyl-m-cresol and therefore can be easily separated from 5-isopropyl-m-cresol by means of rectification. Even if a mixture of isopropylated cresols is contaminated with thymol and 4,6-diisopropyl-m-cresol, these two impurities are removed, because thymol is converted to easily removable 4,6-diisopropyl-m-cresol. When the alkylating agent has more than 4 carbon atoms, the separation by rectification can be more easily carried out.

Another aspect of the present invention is illustrated by the following test, in which a mixture of isopropylated cresols containing a 2,6-diisopropyl derivative was subjected to sec-butylation followed by alkali extraction. An outline of the test is as shown in Table 2. p-Cresol derivatives as shown in Table 2 are unavoidably contaminated in a mixture of isopropylated cresols, since they are derived from a small amount of p-cresol which is usually contained in a technical grade of m-cresol. Among those impurities, m- and p-cresols, and 4,6-diisopropyl-m-cresol can be easily removed by rectification, as shown in Table 2. Although thymol and 2-isopropyl-p-cresol can be relatively easily removed by rectification, it is necessary to use a greater number of plates for complete removal thereof. 2,6-Diisopropyl-m-cresol and 2,6-diisopropyl-p-cresol have boiling points very close to that of 5-isopropyl-m-cresol, but they are different from 5-isopropyl-m-cresol in that the two compounds can not be extracted with an aqueous alkali solution. Since 3-isopropyl-p-cresol is very similar to 5-isopropyl-m-cresol in boiling points and in behavior to alkalis, it can not be removed from 5-isopropyl-m-cresol at all by a usual method. 4-Isopropyl-m-cresol has a slightly higher boiling point than that of 5-isopropyl-m-cresol, and so the complete separation by rectification of the two from each other requires a rectification tower having an extremely large number of plates. A crystallization-separation process based on the fact that 4-isopropyl-m-cresol has a higher melting point, is not effective when the ratio by weight of 4-isopropyl-m-cresol to 5-isopropyl-m-cresol is small. 4,6-Diisopropyl-m-cresol and other polyisopropylcresols can be easily removed by rectification.

Table 2

| Component | Isopropylated cresols — Separation from 5-isopropyl-m-cresol by rectification | Extraction with alkali | Method of the present invention — Butylated compounds | Extraction with alkali |
|---|---|---|---|---|
| m-cresol | easy | extracted | | not extracted |
| p-cresol | easy | extracted | | not extracted |
| thymol | a little easy | extracted | | extracted |
| 2-isopropyl-p-cresol | easy | extracted | | not extracted |
| 2,6-diisopropyl-m-cresol | very difficult | not extracted | hardly butylated | not extracted |

Table 2-continued

| Component | Isopropylated cresols Separation from 5-isopropyl-m-cresol by rectification | Extraction with alkali | Method of the present invention Butylated compounds | Extraction with alkali |
|---|---|---|---|---|
| 2,6-diisopropyl-p-cresol (structure: HO–C₆H₂(i-C₃H₇)₂–CH₃) | very difficult | not extracted | not butylated | not extracted |
| 3-isopropyl-p-cresol (structure: HO–C₆H₃(C₃H₇(i))–CH₃) | very difficult | extracted | HO–C₆H₂(C₃H₇(i))(C₄H₉(sec))–CH₃ | not extracted |
| 5-isopropyl-m-cresol (structure: HO–C₆H₃(CH₃)(C₃H₇(i))) | — | extracted | hardly butylated | extracted |
| 4-isopropyl-m-cresol (structure: HO–C₆H₃(CH₃)–C₃H₇(i)) | difficult | extracted | HO–C₆H₂(CH₃)(C₃H₇(i))(C₄H₉(sec)) | not extracted |
| 4,6-diisopropyl-m-cresol (structure: HO–C₆H₂(CH₃)(C₃H₇(i))(i-C₃H₇)) | easy | extracted | not butylated | extracted |

[Remark]: *) The rate of butylation is rather lower.

As made clear from the above test results, 4-isopropyl-m-cresol and 3-isopropyl-p-cresol can not be removed by conventional methods such as rectification and alkali extraction. According to the present invention, however, those two compounds can be completely removed, together with other impurities, if any, without previous removal of the latter by conventional methods. That is, as shown in the third column of Table 2, according to sec-butylation m-cresol is converted to 4,6-di-sec-butyl-m-cresol, and 6-sec-butyl-m-cresol, 2-isopropyl-p-cresol to 2-isopropyl-6-sec-butyl-p-cresol, 3-isopropyl-p-cresol to 3-isopropyl-6-sec-butyl-p-cresol, and 4-isopropyl-m-cresol to 4-isopropyl-6-sec-butyl-m-cresol, all of which can be removed by a subsequent alkali extraction, and thereby separated from 2,6-diisopropyl derivatives of m- and p-cresols which can not be extracted with alkali. On the contrary, 5-isopropyl-m-cresol is hardly alkylated. In addition, thymol is converted, by the sec-butylation, to the 4-sec-butyl derivative thereof which can be extracted with alkali, and further can be removed together with 4,6-diisopropyl-m-cresol more easily than thymol by rectification. Furthermore, it will be clear from the test results that when the method of the present invention is applied to the mixture of isopropylated cresols, from which a fraction having a lower boiling point than thymol and a fraction having a higher boiling point than 4,6-diisopropyl-m-cresol have been removed by rectification, the desired 5-isopropyl-m-cresol can be obtained in extremely high purity.

For maintaining the selectivity of the products against alkali extraction, the isopropyl group is slightly insufficient as the alkyl group to be introduced, and sec-butyl group or tert-butyl or a higher alkyl group may be preferably used.

The present invention is illustrated by the following examples but is not limited thereto.

EXAMPLE 1

A mixture of isopropylated cresols was extracted with an aqueous sodium hydroxide solution to remove 2,6-diisopropyl-m-cresol and 2,6-diisopropyl-p-cresol and thereby there was obtained a mixture consisting of thymol (1.2%), 3-isopropyl-p-cresol (1.2%), 5-isopropyl-m-cresol (67.7%), 4-isopropyl-m-cresol (24.9%) and 4,6-diisopropyl-m-cresol (5.0%). The mixture thus obtained (300 g) was mixed with sulfuric acid (6 g) and thereto was passed through isobutylene under stirring in a rate of one liter/min., at 80°C and at an atmospheric pressure for 40 minutes. The introduction of isobutylene was stopped when thymol became only slightly observed in the reaction system, and thereto was added a 10% aqueous sodium carbonate solution (100 g). Then the solution was cooled to 30°C under stirring, and allowed to stand at this temperature to separate into two layers. From the separated aqueous layer was obtained an alkylated mixture (348 g). The mixture was rectified in a batchwise packed tower having 10 theoretical plates at 30 mmHg of top pressure, 2 to 5 of reflux ratio to give a fraction (183 g) containing thymol (0.2%), 4,6-diisopropyl-m-cresol (0.4%) and 5-isopropyl-m-cresol (99.2%).

REFERENCE EXAMPLE 1

A mixture of the same composition (10,000 kg) as used in Example 1 was rectified batchwise in a bubble-cap tower having 50 plates at 30 mmHg of top pressure and 18 of reflux ratio. A main fraction (4.400 kg) containing thymol (0.14%), 3-isopropyl-p-cresol (1.6%), 5-isopropyl-m-cresol (88.6%), 4-isopropyl-m-cresol (9.6%) and 4,6-diisopropyl-m-cresol (0.06%) was obtained. A combination of two batches of this fraction was rectified in the same rectification tower at 20 of reflux ratio only to give a fraction (7,400 kg) containing thymol (0.16%), 3-isopropyl-p-cresol (1.7%), 5-isopropyl-m-cresol (95.0%) and 4-isopropyl-m-cresol (3.1%).

EXAMPLE 2

Into a mixture of conc. sulfuric acid (3 kg) and a mixture of isopropylated cresols (150 kg) containing m- and p-cresols (2.2% in total), 2,6-diisopropyl-m- and p-cresols (8.5% in total), thymol and 2-isopropyl-p-cresol (3.7% in total), 4-isopropyl-m-cresol and 3-isopropyl-p-cresol (28.4% in total), 4,6-diisopropyl-m-cresol (1.0%), 5-isopropyl-m-cresol (55.8%) and others (0.4%) was introduced isobutylene gas under stirring at a rate of 500 liter/min. and at 80°C for 45 minutes.

Then, the reaction mixture was cooled and thereto were added toluene (90 kg) and a 10% aqueous caustic soda solution (400 kg). The resulting mixture was maintained at 30° to 40°C for 15 minutes while it was thoroughly mixed by circulation. Thereafter, the solution was allowed to stand for 30 minutes to separate into two layers. The separated alkali layer was once back-extracted with toluene (90 kg) and then conc. sulfuric acid (50 kg) was gradually added thereto under stirring. The temperature of solution was raised up to 65°C at the maximum due to heat of neutralization. After neutralizing to pH 8, the solution was cooled to 30°C and allowed to stand at this temperature for 3 hours to separate into two layers. The recovered oily layer (90 kg) contained water (5%) and phenols including thymol (1.6%), 4,6-diisopropyl-m-cresol and 4-tert-butyl-6-isopropyl-m-cresol (3.1% in total), 5-isopropyl-m-cresol (95.0%) and others (0.3%). The oily layer thus obtained was rectified batchwise in a packed tower having 7 theoretical plates to give 5-isopropyl-m-cresol (75 kg) having 99.2% of purity.

EXAMPLE 3

A mixture of isopropylated cresols containing together m- and p-cresols, thymol, 2-isopropyl-p-cresol, 4,6-diisopropyl-m-cresol and the like was rectified to give a fraction containing thymol (0.1%), 3-isopropyl-p-cresol (2.2%), 5-isopropyl-m-cresol (62.4%), 4-isopropyl-m-cresol (26.0%), 2,6-diisopropyl-m- and p-cresols (9.0% in total), and 4,6-diisopropyl-m-cresol (0.1%). Into a mixture of the fraction thus obtained (150 kg) and p-toluenesulfonic acid (5 kg) was passed through under stirring a $C_4$ hydrocarbon fraction containing isobutylene (44%), n-butenes (41%) and butadiene and acetylene series compounds (below 0.3% in total), in a rate of 500 liter/min (N.T.P.) at 0.5 kg/cm$^2$ (gauge pressure) and at 100°C for 60 minutes. Then, to the reaction mixture was added a 10% aqueous caustic soda solution (12 kg) and the resulting solution was stirred at 100°C for 30 minutes to separate into two layers. The aqueous layer was discarded, and to the oily layer was added a 8% aqueous caustic soda solution (300 kg). The mixture was cooled to 30°C under stirring for 30 minutes and allowed to stand for 1 hour to separate into two layers. The oily layer was discarded, and to the alkali layer was added hexane (100 kg) to back-extract an oily material remaining in the layer. Then, carbon dioxide gas was introduced into the alkali extract to make pH 8.5, and the extract was separated at 35°C to obtain an oily layer (95 kg) containing 4.8% of water. The oily layer was subjected to a simple distillation to give a forerum containing water and hexane which was discarded, and a 5-isopropyl-m-cresol fraction (87 kg; purity above 99.5%) which contained thymol (below 0.1%), and 4,6-diisopropyl-m-cresol and 4-butyl-6-isopropyl-m-cresol (0.2% in total).

EXAMPLE 4

The same mixture of isopropylated cresols (150 g; 5-isopropyl-m-cresol content: 62.4%) as that used in Example 3 was mixed with p-toluenesulfonic acid (5 g) and nonene (70 g). The mixture thus obtained was heated to 145°C under stirring and kept at this temperature for 2 hours. After cooling to 50°C, to the mixture was added a 10% aqueous potassium hydroxide solution (250 g). The resulting mixture was shaken for 5 minutes with a separating funnel, and allowed to stand for 30 minutes to separate into two layers. After the upper oily layer was discarded, nonene (70 g) was added to the alkali layer and the resulting solution was shaken similarly to separate into two layers. The separated nonene layer was used repeatedly. To the alkali layer was added gradually a 50% sulfuric acid (42 g), and the mixture was cooled to 30°C and allowed to stand for 30 minutes to separate into two layers. The aqueous layer was once extracted with hexane (70 g), and the hexane layer and the oily layer were combined and distilled to give 5-isopropyl-m-cresol (90 g; purity: 99.4%).

What is claimed is:

1. A method for the separation of 5-isopropyl-m-cresol from a mixture of isopropylated cresols containing 5-isopropyl-m-cresol, 4-isopropyl-m-cresol, 3-isopropyl-p-cresol, and 2,6-diisopropyl-m- and p-cresols, which comprises reacting the mixture with an alkylating agent selected from the group consisting of monoolefins having from 4 to 12 carbon atoms, at a temperature of 0° to 300°C. under a pressure of atmospheric to 10 kg/cm² in the presence of at least one catalyzer selected from the group consisting of hydrogen fluoride, sulfuric acid, phosphoric acid, perchloric acid, p-toluenesulfonic acid, aluminum chloride, boron trifluoride, ferric chloride, zinc chloride, titanium chloride, alumino-silicate, terra alba and sulfonic acid type ion exchange resins, and recovering unalkylated 5-isopropyl-m-cresol from the resulting mixture by an alkali extraction using 1 to 30% by weight aqueous sodium hydroxide or potassium hydroxide solution at a temperature of 0° to 100°C.

2. The method according to claim 1, wherein the alkylating agent is a gas fraction having 4 carbon atoms which is free from butadiene.

3. The method according to claim 1, wherein the alkylating agent is used in an amount of about 1.0 to about 2.5 times by weight of the theoretical.

4. The method according to claim 1, wherein the alkylating agent is isobutylene.

5. The method according to claim 1, wherein the catalyzer is sulfuric acid.

* * * * *